C. A. CLARK.
INDICATOR FOR SWITCHES.
APPLICATION FILED SEPT. 21, 1908.

934,421.

Patented Sept. 14, 1909.

WITNESSES
J Clyde Ripley.
Kate Brenner.

INVENTOR
Charles A. Clark.
BY
W. H. Barker.
ATTORNEYS

UNITED STATES PATENT OFFICE.

CHARLES A. CLARK, OF HARTFORD, CONNECTICUT, ASSIGNOR TO TRUMBULL ELECTRIC MANUFACTURING COMPANY, OF PLAINVILLE, CONNECTICUT, A CORPORATION OF CONNECTICUT.

INDICATOR FOR SWITCHES.

934,421.

Specification of Letters Patent. Patented Sept. 14, 1909.

Application filed September 21, 1908. Serial No. 453,973.

*To all whom it may concern:*

Be it known that I, CHARLES A. CLARK, a citizen of the United States, and a resident of Hartford, in the county of Hartford and State of Connecticut, whose post-office address is 62 Maple avenue, Hartford, Connecticut, have invented certain new and useful Improvements in Indicators for Switches, of which the following is a full, clear, and exact description, whereby any one skilled in the art may make and use the same.

The invention relates to indicators and more particularly to an indicator for an electric switch, so arranged that there will be a visual showing to indicate the position of the switch parts and insure the operator whether the circuit of the switch is open or closed.

The object of the invention is to provide a simple and efficient indicator, of convenient form for use in connection with a switch mechanism, and with the inclosing cover therefor, and one which may be readily placed in position with reference to the switch parts, to properly indicate the position of said parts and whether the circuit of the switch is in closed or open position.

A still further object is to so arrange the indicator, with reference to the inclosing cover of the switch, that said cover may be readily applied to or removed from the switch mechanism, without liability of disarranging the parts or the proper indications of the indicator dial, thus obviating all liability of incorrect initial placing of the dial.

Figure 1:
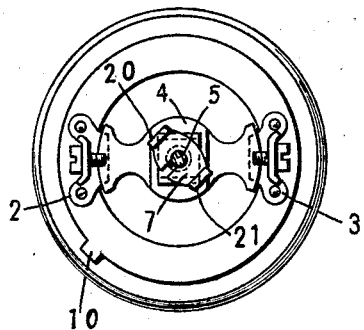
Figure 2:
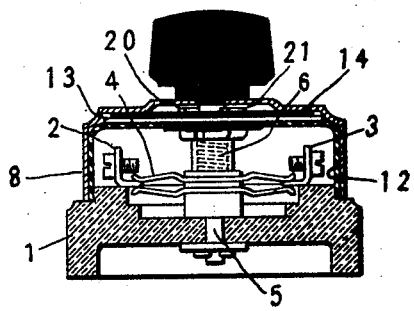
Figure 3:
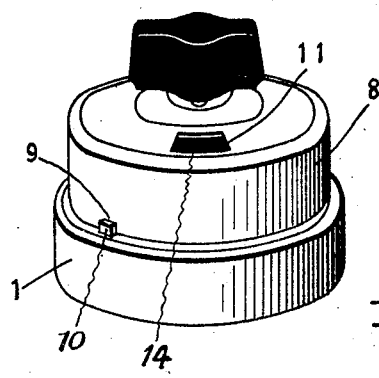
Figure 5:
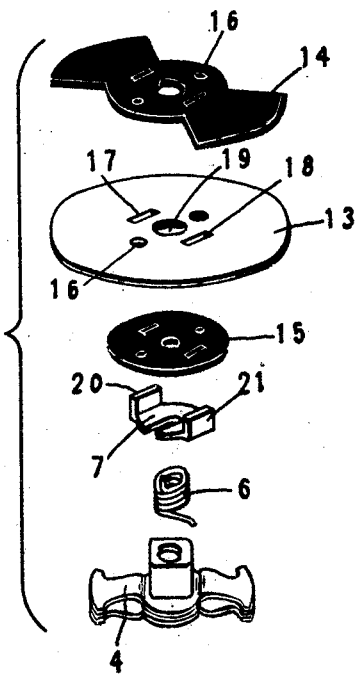
Figure 4:
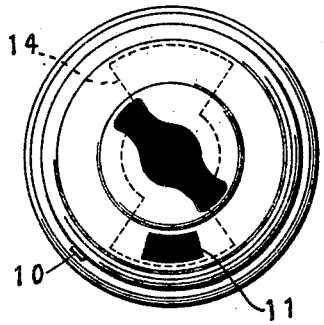

Referring to the drawings: Figure 1 illustrates a plan view of a switch mechanism with the cover removed. Fig. 2 is a cross-sectional view through the base and cover illustrating the switch mechanism in elevation with the indicator dial in place. Fig. 3 is a perspective view of a switch and cover embodying the invention. Fig. 4 is a plan view of a switch cover illustrating in dotted outline the position of the indicator dial. Fig. 5 is a perspective view of the several parts of the indicator dial and switch parts appurtenant thereto shown in position for assembling.

It is most desirable in electric switches, particularly where the mechanism is inclosed, to provide a visual indicator by which the operator may ascertain at a glance whether the circuit of the switch is open or closed. Such a device is particularly useful in connection with so called rotary snap switches, where the rotation of a button causes a rotary commutator to make and break the electric circuit between contacts connected with the line wires of the circuit. In such devices there is ordinarily employed a rotary commutator bar which, by its position with reference to stationary contacts, either makes or breaks the electric circuit between said stationary contacts. It is also important that the dial be associated in some semifixed relation with the inclosing cover of the switch mechanism and so arranged that an application of the cover to the mechanism will insure a definite and proper positioning of the indicator dial with reference to the commutator bar or bars.

As illustrated herein, the switch mechanism is not shown or described in specific details, it being well understood that in such devices, the rotary commutator members are rotated in a step by step movement and occupy either one of two positions forming a closed or open circuit through the switch terminals.

It is obvious that the indicator dial hereinafter disclosed may be applied to a single or multiple pole switch with ordinary and simple modifications.

In the accompanying drawings, the numeral 1, denotes a base of insulating material shown herein as supporting a pair of stationary contacts 2, 3, which coöperate with a rotary commutator bar 4, to form or break a connection with an electric circuit, the terminal wires of which are connected respectively to the contacts 2, and 3, in any suitable manner. The commutator bar 4, is rotated by a spindle 5, properly connected to rotate the commutator bar 4, when said bar is released by a mechanism not herein shown. To effect a quick release and engagement of the bar 4, with reference to its contacts, a spring 6, is employed, one end of which is attached to the commutator bar while the opposite end is attached to a spring clip 7, mounted upon the spindle 5, so that a rotation of the spindle tensions the spring 6, and thereby places the commutator bar 4, under the action of the spring. When the spring is sufficiently tensioned, a releasing mechanism, not shown herein, releases the commutator bar and the spring 6, thereupon causes it to quickly rotate to its next succeeding position. Such a mechanism is common in practically all rotary snap switches and is only briefly described herein, as the spring clip forms the necessary connection for actuating the indicator dial hereinafter described.

The operating parts of the mechanism are inclosed by a cup-like cover 8, which is provided with a notch 9, engaging a lug 10, on the base of insulating material, thus, insuring a proper engagement of the base and cover in predetermined relation. This cover 8, is provided with a sight-opening 11, through which the indicator dial is visible, and a lining of insulating material 12, conforming to the outlines of the cover, insures insulation of all of the various parts of the switch mechanism from the cover.

Within the cover and between it and its lining is arranged the indicator which consists of a rotary dial adapted to be rotated upon a movement of the switch spindle and commutator bar. As shown in detail herein, the dial comprises a disk 13, preferably of a light colored material above which is arranged a dark colored indicator 14, secured to the disk 13, through the medium of a washer 15, as by rivets extending through rivet holes 16. Extending partially or wholly through the parts thus forming the indicator dial, are perforations 17, 18, located on diametrically opposite sides of a central perforation 19. The central perforation fits about the spindle 5, while the diametrically opposite perforations 17, 18, are arranged to engage up-turned lugs 20, and 21, of the spring clip 7, when the cover 8, is placed in position. A washer 15, lying below the disk 13, may be of a convenient size to form a sort of bearing in the lining 12, of the cover, and as the perforations 17, 18, pass through this washer, the up-turned lugs 20, and 21, of the spring clip do not interfere in any way with the lining of the cover and this lining, together with the arrangement of parts of the dial form a perfect insulation between the switch mechanism and the cover 8.

It will be noted that the parts of the dial when assembled, are so associated that the diametrically opposite openings 17, 18, are in the central line of the dark colored portion 14, of the dial, and as the spring clip 7, is assembled in a definite manner with reference to the commutator bar 4, it follows that whenever the cover with its dial is placed in position, the dark portion of the dial must necessarily occupy a definite relative position to the commutator bar 4, and the sight opening 11. As the cover 8, must always be brought into certain registering position with the base through the notch 9, and projection 10, it also follows that it is impossible to place the cover on the switch base, unless the indicator dial occupies the proper recording position with reference to the commutator bar, no matter whether said bar is in open or closed position.

There is, of course, an advantage in having the indications arranged as illustrated inasmuch as there can then be no mistake of indication caused by assembling the parts. The washer 15, located below the main disk 13, of the dial, forms a sort of bearing in the lining of the cover which prevents accidental lateral displacement thereof, and when the spindle is passed through the central perforation 19, the parts will be brought into registering position with the lugs 20, 21, projecting into the perforations 17, 18.

The advantages of the device are apparent. The indicator dial is formed separate and distinct from the cover and its lining and rests freely within the cover although provided with means for insuring its proper engagement with the switch mechanism. The indicator dial is complete in itself and needs no delicate adjustment of bearings with reference to the switch cover or lining as it is confined against accidental removal from the cover and is free to engage the upwardly projecting lugs of the spring clip, which is directly though resiliently connected with the commutator bar in a predetermined position.

What I claim as my invention and desire to secure by Letters Patent is:

1. An indicator for electric switches comprising a disk having a central and two diametrically opposed perforations bearing, on its upper face, a plate of distinctive color differing from the disk and extending across the plate, said indicator plate having perforations registering with the perforations of the disk, a plate on the lower face of the disk having registering perforations and means for securing the disk and plates together with the perforations in registering position.

2. An indicator for electrical switches comprising a disk having a central and two diametrically opposed perforations, said disk bearing on its upper face an indicator plate extending across the disk, said plate provided with similar registering perforations and of a distinctive color differing from the disk, and on its lower face a disk bearing registering perforations, said disks and plate secured to form a substantially integral structure with the perforations in registering position.

CHARLES A. CLARK.

Witnesses:
F. T. WHEELER,
HENRY TRUMBULL.